US009760724B2

(12) United States Patent
Frost

(10) Patent No.: US 9,760,724 B2
(45) Date of Patent: *Sep. 12, 2017

(54) IMAGE ANALYSIS AND MANAGEMENT

(71) Applicant: Citrix Systems, Inc., Fort Lauderdale, FL (US)

(72) Inventor: Simon Frost, Harpenden (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/726,854

(22) Filed: Jun. 1, 2015

(65) Prior Publication Data

US 2015/0261969 A1    Sep. 17, 2015

Related U.S. Application Data

(63) Continuation of application No. 13/886,543, filed on May 3, 2013, now Pat. No. 9,064,125.

(51) Int. Cl.
*G06F 21/00* (2013.01)
*G06F 21/62* (2013.01)
(Continued)

(52) U.S. Cl.
CPC ........ *G06F 21/6209* (2013.01); *G06F 21/554* (2013.01); *G06F 21/604* (2013.01);
(Continued)

(58) Field of Classification Search
CPC ...... G06F 21/6209; G06F 21/88; G06F 21/62; G06F 21/604; G06F 21/554;
(Continued)

(56) References Cited

U.S. PATENT DOCUMENTS 5,734,752 A * 3/1998 Knox .................... G06T 1/0028
235/494
6,721,437 B1 * 4/2004 Ezaki ...................... G06T 1/005
380/200

(Continued)

OTHER PUBLICATIONS

Jul. 20, 2017—(EP) Examination Report—App 14728038.2.

*Primary Examiner* — David Cervetti
(74) *Attorney, Agent, or Firm* — Banner & Witcoff, Ltd.

(57) ABSTRACT

Systems, methods and apparatuses are described herein that allow an enterprise to analyze and manage work product images that are stored on a mobile device. Employees of an enterprise may use a mobile device to store both work product images (e.g., images of sensitive or proprietary information) and non-work product images (e.g., personal images). An enterprise may desire to enforce security protocols on the work product images, but the employee may not want the security protocols applied to the non-work product images. In some embodiments, by installing and executing an image manager that is able to analyze and manage images, the enterprise can enforce security protocols on only the work product images. Such security protocols may include the prevention of unauthorized viewing of the work product image (e.g., by encrypting the work product image) or deleting any work product image from the mobile device when the employee's employment has ended.

20 Claims, 9 Drawing Sheets

(51) Int. Cl.
*G06F 21/55* (2013.01)
*G06F 21/88* (2013.01)
*H04N 1/44* (2006.01)
*H04W 12/12* (2009.01)
*G06F 21/60* (2013.01)
*G06K 9/00* (2006.01)
*H04N 1/00* (2006.01)
*H04W 12/02* (2009.01)
*H04W 88/02* (2009.01)

(52) U.S. Cl.
CPC .............. *G06F 21/62* (2013.01); *G06F 21/88* (2013.01); *G06K 9/00456* (2013.01); *G06K 9/00469* (2013.01); *H04N 1/00846* (2013.01); *H04N 1/00859* (2013.01); *H04N 1/00875* (2013.01); *H04N 1/444* (2013.01); *H04W 12/02* (2013.01); *H04W 12/12* (2013.01); *H04W 88/02* (2013.01)

(58) Field of Classification Search
CPC ........... H04N 1/00875; H04N 1/00859; H04N 1/00846; H04N 1/444; G06K 9/00469; G06K 9/00456; H04W 88/02; H04W 12/02; H04W 12/12
See application file for complete search history.

(56) References Cited

U.S. PATENT DOCUMENTS

| | | | |
|---|---|---|---|
| 7,158,176 B2* | 1/2007 | Tokkonen | G06F 12/121 348/207.11 |
| 7,281,272 B1* | 10/2007 | Rubin | G06F 17/211 345/530 |
| 7,343,320 B1* | 3/2008 | Treyz | G06Q 30/0601 345/428 |
| 7,606,840 B2* | 10/2009 | Malik | G06F 17/30194 |
| 7,617,195 B2* | 11/2009 | Liang | G06F 17/30011 |
| 7,634,134 B1* | 12/2009 | So | G06T 1/0085 380/201 |
| 7,711,835 B2* | 5/2010 | Braddy | G06F 17/30867 709/202 |
| 7,769,197 B2* | 8/2010 | Fujii | G06T 1/0028 380/54 |
| 7,827,440 B1* | 11/2010 | Dudte | G06F 11/0742 714/42 |
| 7,865,603 B2* | 1/2011 | Braddy | G06F 17/30867 709/202 |
| 7,870,294 B2* | 1/2011 | Braddy | G06F 17/30867 709/225 |
| 8,065,423 B2* | 11/2011 | Braddy | G06F 17/30867 709/225 |
| 8,120,795 B2* | 2/2012 | Qi | G03G 21/046 358/1.14 |
| 8,234,496 B1* | 7/2012 | Ding | G06F 21/16 713/161 |
| 8,280,098 B2* | 10/2012 | Yadid-Pecht | G06T 1/0035 348/308 |
| 8,311,985 B2* | 11/2012 | O'Keefe | G06F 11/1453 707/640 |
| 8,320,611 B2* | 11/2012 | Alattar | G06F 17/2294 382/100 |
| 8,352,606 B2* | 1/2013 | Braddy | G06F 17/30867 709/225 |
| 8,365,243 B1 | 1/2013 | Lu et al. | |
| 8,379,245 B2* | 2/2013 | Maeno | G06F 21/608 358/1.14 |
| 8,472,084 B2* | 6/2013 | Lim | H04N 1/32144 358/3.28 |
| 8,554,176 B2* | 10/2013 | McLean | G06F 21/602 455/410 |
| 8,677,132 B1* | 3/2014 | Liao | H04L 9/0888 713/176 |
| 8,699,075 B2* | 4/2014 | Privault | G06F 17/30265 358/1.16 |
| 8,850,597 B1* | 9/2014 | Gates | G06F 17/30528 726/26 |
| 8,887,300 B1* | 11/2014 | Gates | H04L 63/10 713/168 |
| 9,047,253 B1* | 6/2015 | Gates | G06K 9/00335 |
| 9,055,071 B1* | 6/2015 | Gates | H04L 63/1408 |
| 9,208,326 B1* | 12/2015 | Gates | G06F 21/60 |
| 9,256,748 B1* | 2/2016 | Gates | G06F 21/60 |
| 2002/0087885 A1* | 7/2002 | Peled | G06F 17/30017 726/26 |
| 2002/0122565 A1* | 9/2002 | Keating | G06T 1/0028 382/100 |
| 2002/0141611 A1* | 10/2002 | Keating | G06T 1/0028 382/100 |
| 2002/0184535 A1* | 12/2002 | Moaven | G06F 21/6218 726/17 |
| 2003/0076979 A1* | 4/2003 | Matsui | G06T 1/0028 382/100 |
| 2003/0166399 A1* | 9/2003 | Tokkonen | G06F 12/121 455/419 |
| 2003/0210803 A1* | 11/2003 | Kaneda | G06T 1/0028 382/100 |
| 2004/0003253 A1* | 1/2004 | Ogino | G06Q 20/401 713/176 |
| 2004/0091132 A1* | 5/2004 | Eguchi | G06T 1/0021 382/100 |
| 2004/0243806 A1* | 12/2004 | McKinley | G06Q 20/3823 713/176 |
| 2005/0058319 A1* | 3/2005 | Rhoads | G06F 17/241 382/100 |
| 2005/0141010 A1* | 6/2005 | Kanai | G06F 21/608 358/1.14 |
| 2006/0004697 A1* | 1/2006 | Lipsky | G06F 17/30265 |
| 2006/0069668 A1* | 3/2006 | Braddy | G06F 17/30867 |
| 2006/0069683 A1* | 3/2006 | Braddy | G06F 17/30867 |
| 2006/0074837 A1* | 4/2006 | Braddy | G06F 17/30867 |
| 2006/0075463 A1* | 4/2006 | Braddy | G06F 17/30867 726/1 |
| 2006/0200570 A1* | 9/2006 | Stirbu | G06F 17/30067 709/230 |
| 2007/0129012 A1* | 6/2007 | Snow | H04M 1/72577 455/26.1 |
| 2007/0266252 A1* | 11/2007 | Davis | G06F 21/10 713/176 |
| 2007/0297013 A1* | 12/2007 | Nakagawa | H04N 1/00846 358/3.28 |
| 2008/0032739 A1* | 2/2008 | Hoodbhoy | G06Q 10/06 455/556.2 |
| 2008/0196059 A1* | 8/2008 | Evans | G06F 21/608 725/32 |
| 2008/0212824 A1* | 9/2008 | Braudaway | G06T 1/005 382/100 |
| 2008/0243842 A1* | 10/2008 | Liang | G06F 17/30011 |
| 2008/0276089 A1* | 11/2008 | Tian | G06F 21/10 713/168 |
| 2009/0075630 A1* | 3/2009 | McLean | G06F 21/602 455/411 |
| 2009/0163174 A1 | 6/2009 | Baik et al. | |
| 2009/0165083 A1* | 6/2009 | McLean | G06F 21/10 726/1 |
| 2009/0197584 A1* | 8/2009 | Snow | H04M 1/72577 455/418 |
| 2009/0249011 A1* | 10/2009 | Ohishi | G06F 11/1456 711/162 |
| 2009/0249497 A1* | 10/2009 | Fitzgerald | H04W 12/12 726/35 |
| 2009/0253406 A1* | 10/2009 | Fitzgerald | G06F 21/88 455/410 |
| 2009/0253410 A1* | 10/2009 | Fitzgerald | G06F 21/88 455/411 |
| 2009/0257076 A1* | 10/2009 | Qi | G03G 21/046 358/1.14 |
| 2010/0070476 A1* | 3/2010 | O'Keefe | G06F 11/1453 707/640 |

(56) References Cited

U.S. PATENT DOCUMENTS

| | | | |
|---|---|---|---|
| 2010/0235336 A1* | 9/2010 | Kim | G06F 17/30247 707/705 |
| 2010/0272362 A1* | 10/2010 | Ohnishi | H04N 1/00374 382/187 |
| 2010/0299376 A1 | 11/2010 | Batchu et al. | |
| 2011/0047341 A1* | 2/2011 | Yu | G06F 11/1464 711/162 |
| 2011/0299723 A1* | 12/2011 | Ohira | H04N 1/00867 382/100 |
| 2012/0030546 A1* | 2/2012 | Alattar | G06F 17/2294 714/782 |
| 2012/0140978 A1* | 6/2012 | Kim | H04N 21/4318 382/100 |
| 2012/0218284 A1* | 8/2012 | Yager | G09G 5/003 345/589 |
| 2012/0230577 A1* | 9/2012 | Calman | G06Q 20/042 382/138 |
| 2013/0130651 A1* | 5/2013 | Deasy | C09J 7/041 455/411 |
| 2013/0130652 A1* | 5/2013 | Deasy | C09J 7/041 455/411 |
| 2013/0130653 A1* | 5/2013 | Deasy | C09J 7/041 455/411 |
| 2013/0223673 A1* | 8/2013 | Davis | G06K 9/78 382/100 |
| 2013/0300675 A1* | 11/2013 | Tsutsui | G06F 3/04883 345/173 |
| 2013/0305146 A1* | 11/2013 | Hashiba | G06F 17/30011 715/255 |
| 2014/0052555 A1* | 2/2014 | MacIntosh | G06Q 20/208 705/23 |
| 2014/0072225 A1* | 3/2014 | Ogawa | G06K 9/18 382/186 |
| 2014/0119659 A1* | 5/2014 | Sugiura | G06K 9/00416 382/189 |
| 2014/0212051 A1* | 7/2014 | Chukka | G06K 9/00624 382/206 |
| 2014/0219563 A1* | 8/2014 | Rodriguez-Serrano | G06K 9/18 382/182 |
| 2014/0229526 A1* | 8/2014 | Saib | G06F 9/547 709/203 |

* cited by examiner

IMAGE ANALYSIS AND MANAGEMENT

CROSS-REFERENCE TO RELATED APPLICATIONS

This application is a continuation of and claims priority to U.S. application Ser. No. 13/886,543, filed May 3, 2013 (now U.S. Pat. No. 9,064,125), which is incorporated herein by reference in its entirety.

FIELD

Aspects described herein generally relate to image analysis. More specifically, various aspects provide techniques for automatically detecting content depicted in an image file and automatically performing an action based on the detected image.

BACKGROUND

Mobile devices have become essential business tools. Even when a user uses his or her mobile device for commercial or business use, the devices are increasingly owned by the user rather than being owned by an employer. One of the ways in which mobile devices are used is as a tool in meetings to capture the results of collaboration on a whiteboard or flipchart by taking a photograph using a built in camera on the mobile device to take a photo of the information. Such information may belong to or be owned by the employer, regardless of the fact that the photo may be stored in the user's mobile device photo gallery along with other images for that user, which may include family photos and other personal imagery. An image depicting employer owned information may be referred to herein as a "work product image."

When an employee leaves a company, the employee is often required to return any company owned intellectual property (IP) before leaving. This may include work product images. However, there is no way for the company or employer to delete (wipe) the work product images from the user's device without wiping the whole photo or image gallery. Wiping the entire gallery, however, will remove all the user's photos, both personal and corporate.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to techniques for processing images stored on a mobile device to classify the content of each image and to identify certain types of images as potential corporate property. Images classified as corporate property may subsequently be managed differently from images not classified as corporate property. Stated differently, aspects described herein selectively identify and control imagery depicting company (non-personal) information when those images are mixed in with user owned non-corporate (personal) content.

Various aspects described herein provide methods, systems and apparatuses that allow for the analysis and management of work product images. According to one or more aspects, the analysis and management of the work product may include registering a mobile device with an enterprise resource or enterprise service provided by an enterprise; installing an image manager on the mobile device; and executing the image manager on the mobile device.

The image manager may be configured to perform various functions including, for example, selecting a first image stored on the mobile device; processing the first image to identify one or more elements present in the first image; determining that the first image is a work product image based on the one or more elements present in the first image; responsive to determining that the first image is a work product image, storing a copy of the first image to a work product image backup location and editing the first image to prevent unauthorized viewing of the first image on the mobile device; determining that an action has occurred, such as one that indicates a user of the mobile device is no longer employed by the enterprise; and responsive to determining that the action has occurred, performing a deletion of work product images from the mobile device, which includes deleting the first image from the mobile device. In some arrangements, other images, such as those determined to be non-work product images may be ignored during the deletion of the work product images.

Other aspects relate to the image manager performing user actions based on restricted image security. For example, an image manager may remove the restricted image security from a work product image when a user views or opens the work product image. An image manager may also reapply the restricted image security to a work product image when a user closes the work product image.

Further aspects may relate to how a work product image is determined. For example, determining whether an image is a work product image may be dependent on the elements present in the image. In some variations, the presence of whiteboards, charts (e.g., a flipchart), hand drawn writing, hand drawn graphs, or machine readable codes (e.g., quick recognition codes or bar codes) may be used to determine whether an image is a work product image.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein provide systems, methods and apparatuses that allow an enterprise to analyze and manage work product images that are stored on a mobile device. Employees of an enterprise may use a mobile device to store both work product images (e.g., images of sensitive or proprietary information) and non-work product images (e.g., personal images). An enterprise may desire to enforce security protocols on the work product images, but the employee may not want the security protocols applied to the non-work product images. In some embodiments, by installing and executing an image manager that is able to analyze and manage images, the enterprise can enforce security protocols on only the work product images. Such security protocols may include the prevention of unauthorized viewing of the work product image (e.g., by encrypting the work product image) or deleting any work product image from the mobile device when the employee's employment has ended (but ignoring the non-work product images that are stored on the mobile device).

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
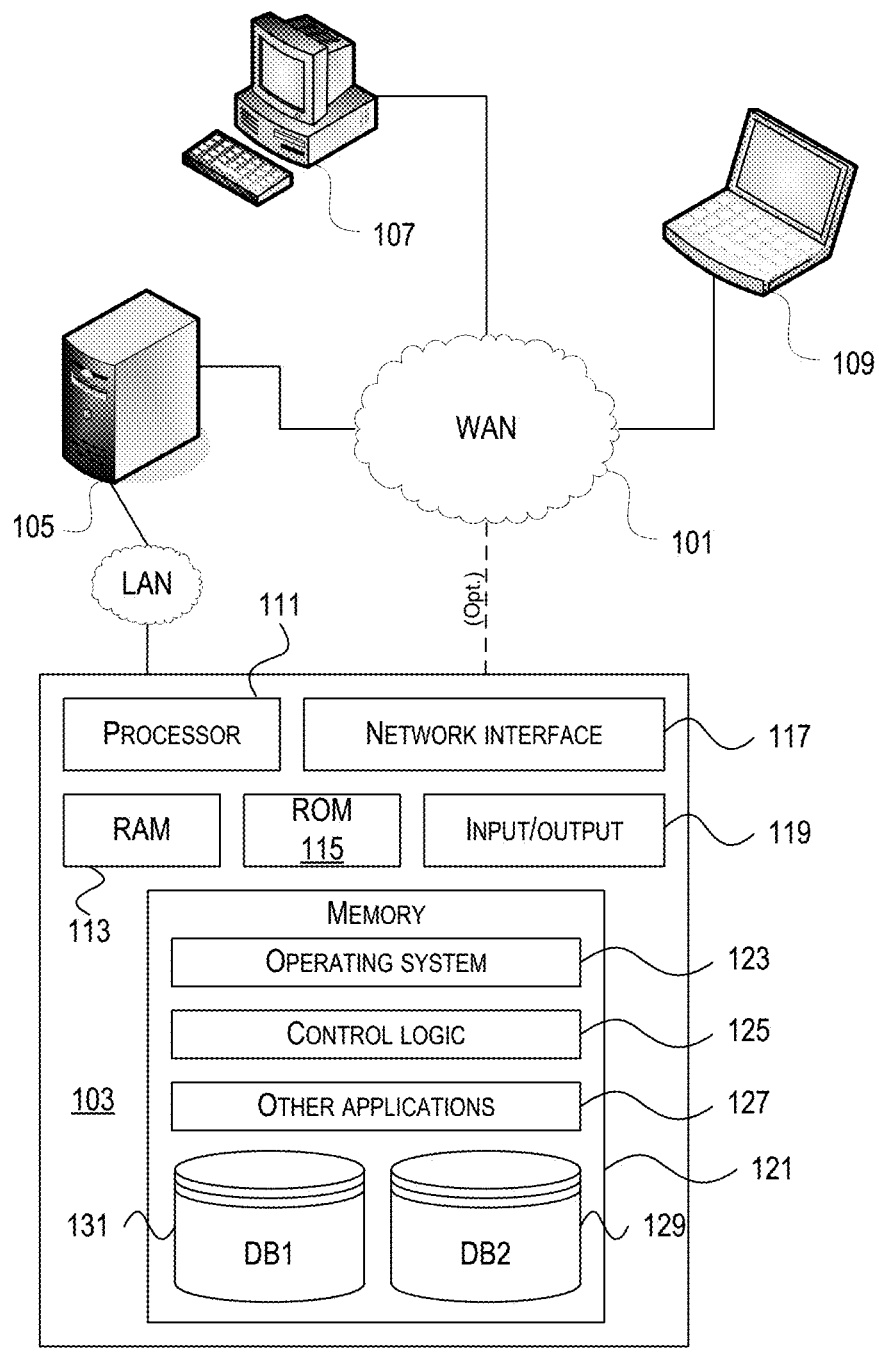
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the invention in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the invention as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the invention as described herein, and other application software 127 providing secondary, support, and/or other functionality which may or may not be used in conjunction with aspects of the present invention. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the invention, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionality may be embodied in whole or in part in software, firmware and/or hardware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2:
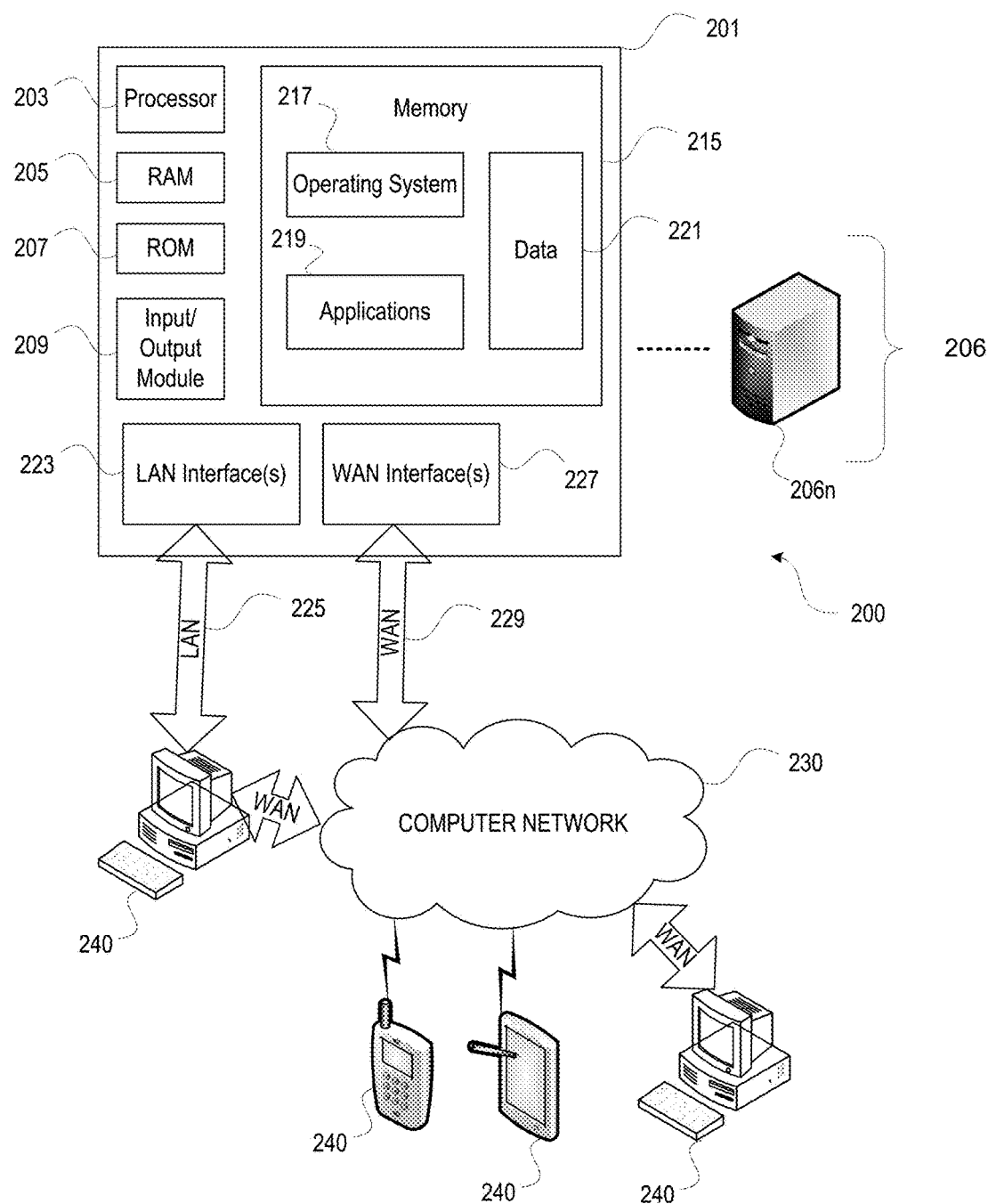
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
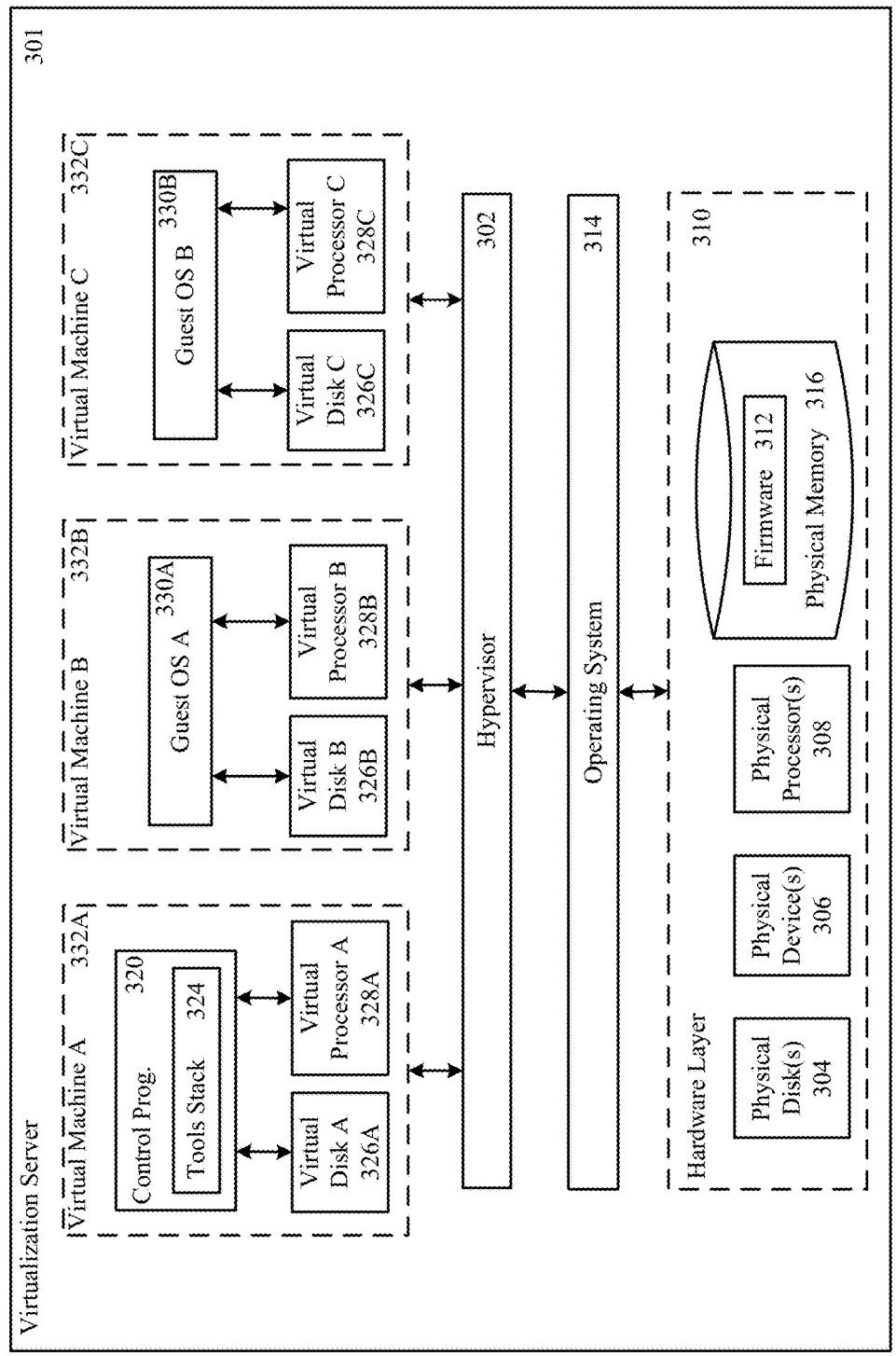
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
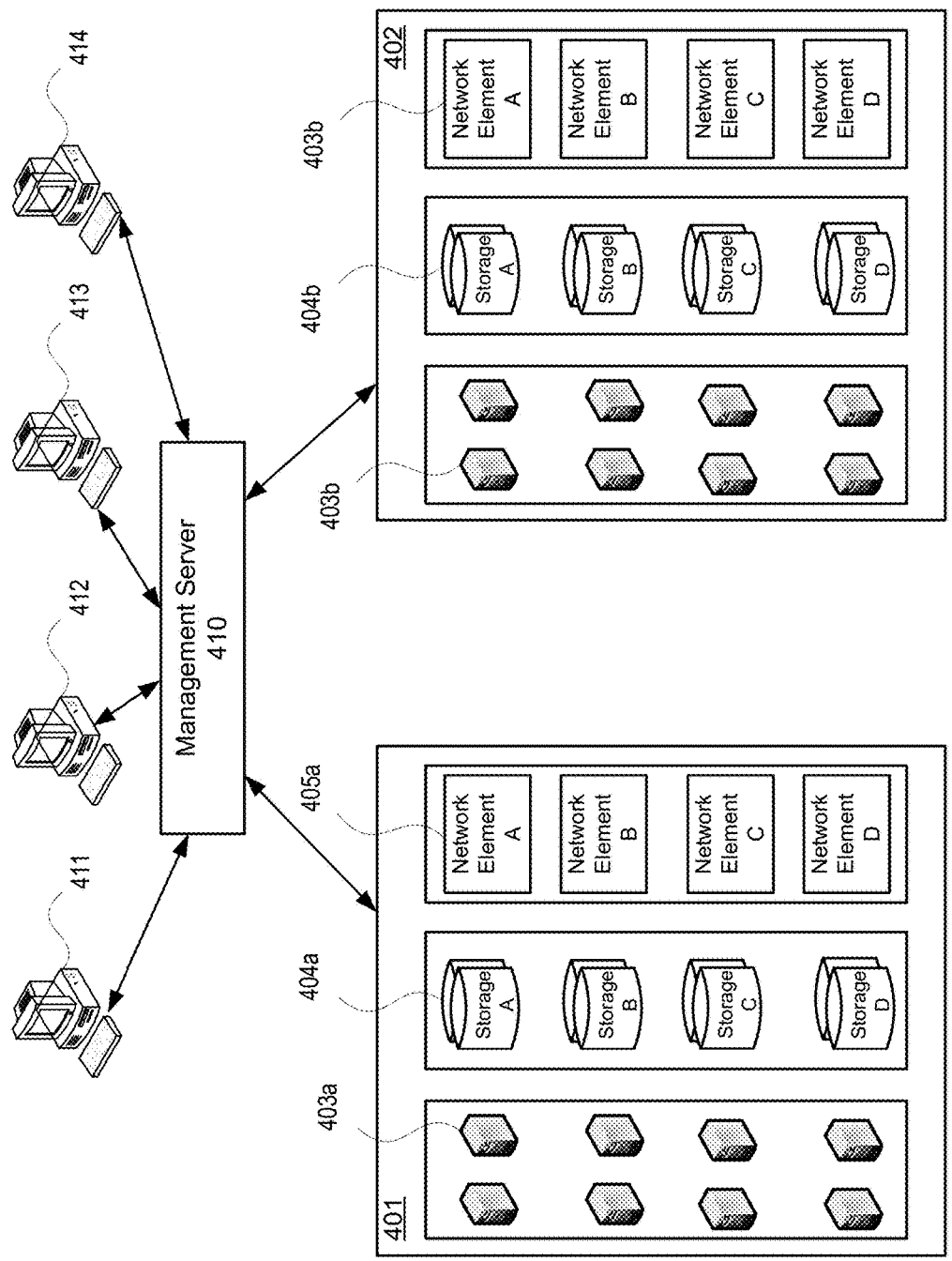
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
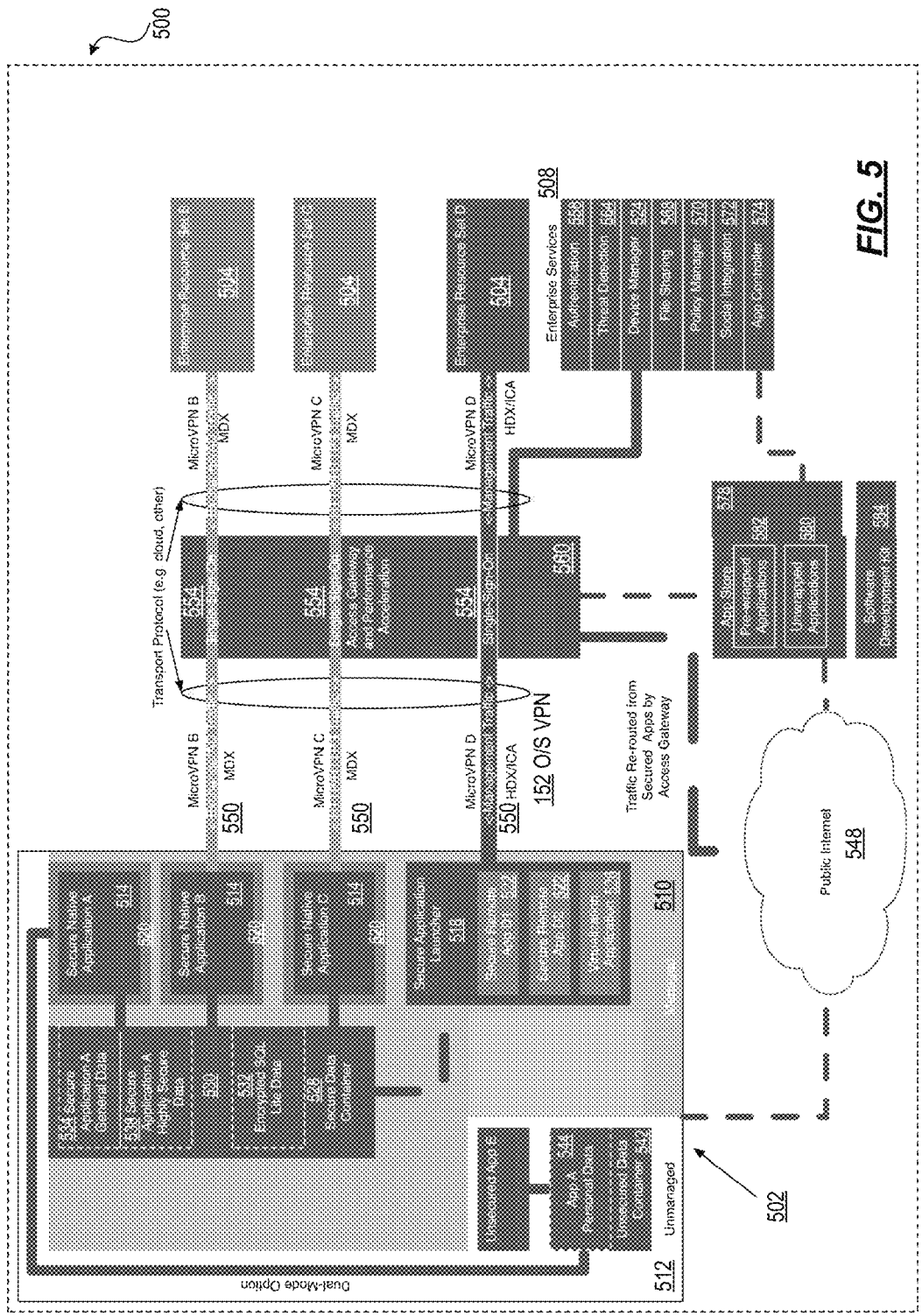
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

The operating system of the mobile device may be separated into a managed partition 510 and an unmanaged partition 512. The managed partition 510 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 524. The device manager 524 may monitor the stabilized applications and utilize techniques for detecting and remedying problems that would result in a destabilized application if such techniques were not utilized to detect and remedy the problems.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
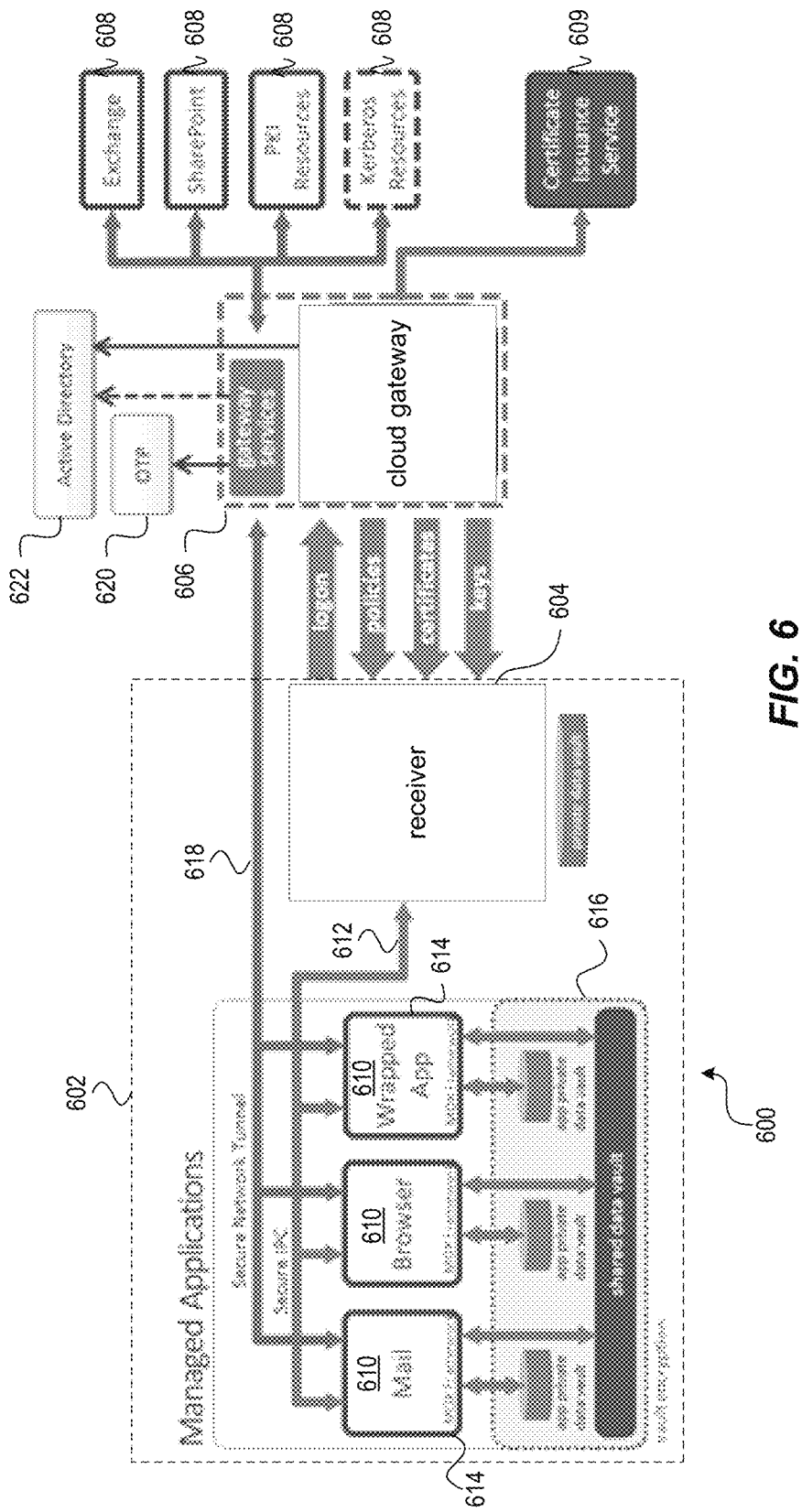
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a receiver 604, which interacts with cloud gateway 606 (which includes Access Gateway and App Controller functionality) to access various enterprise resources 608 and services 609 such as Exchange, Sharepoint, PKI Resources, Kerberos Resources, Certificate Issuance service, as shown on the right hand side above. Although not specifically shown, the mobile device 602 may also interact with an enterprise application store (StoreFront) for the selection and downloading of applications.

The receiver 604 acts as the UI (user interface) intermediary for Windows apps/desktops hosted in an Enterprise data center, which are accessed using the HDX/ICA display remoting protocol. The receiver 604 also supports the installation and management of native applications on the mobile device 602, such as native iOS or Android applications. For example, the managed applications 610 (mail, browser, wrapped application) shown in the figure above are all native applications that execute locally on the device. Receiver 604 and MDX (mobile experience technology) of this architecture act to provide policy driven management capabilities and features such as connectivity and SSO (single sign on) to enterprise resources/services 608. The receiver 604 handles primary user authentication to the enterprise, normally to Access Gateway (AG) with SSO to other cloud gateway components. The receiver 604 obtains policies from cloud gateway 606 to control the behavior of the MDX managed applications 610 on the mobile device 602.

The Secure IPC links 612 between the native applications 610 and receiver 604 represent a management channel, which allows receiver to supply policies to be enforced by the MDX framework 614 "wrapping" each application. The IPC channel 612 also allows receiver 604 to supply credential and authentication information that enables connectivity and SSO to enterprise resources 608. Finally the IPC channel 612 allows the MDX framework 614 to invoke user interface functions implemented by receiver 604, such as online and offline authentication.

Communications between the receiver 604 and cloud gateway 606 are essentially an extension of the management channel from the MDX framework 614 wrapping each native managed application 610. The MDX framework 614 requests policy information from receiver 604, which in turn requests it from cloud gateway 606. The MDX framework 614 requests authentication, and receiver 604 logs into the gateway services part of cloud gateway 606 (also known as NetScaler Access Gateway). Receiver 604 may also call supporting services on cloud gateway 606, which may produce input material to derive encryption keys for the local data vaults 616, or provide client certificates which may enable direct authentication to PKI protected resources, as more fully explained below.

In more detail, the MDX Framework 614 "wraps" each managed application 610. This may be incorporated via an explicit build step, or via a post-build processing step. The MDX Framework 614 may "pair" with receiver 604 on first launch of an application 610 to initialize the Secure IPC channel and obtain the policy for that application. The MDX Framework 614 may enforce relevant portions of the policy that apply locally, such as the receiver login dependencies and some of the containment policies that restrict how local OS services may be used, or how they may interact with the application 610.

The MDX Framework 614 may use services provided by receiver 604 over the Secure IPC channel 612 to facilitate authentication and internal network access. Key management for the private and shared data vaults 616 (containers) may be also managed by appropriate interactions between the managed applications 610 and receiver 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The MDX Framework 614 is responsible for orchestrating the network access on behalf of each application 610. Receiver 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, cloud gateway 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein cloud gateway 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (cloud gateway 606), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the MDX framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the receiver 604 may require the user to set a custom offline password and the AD password is not used. Cloud gateway 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the MDX micro VPN feature). For example, an application such as @WorkMail may utilize such a certificate. In this case, certificate-based authentication using ActiveSync protocol may be supported, wherein a certificate from the receiver 604 may be retrieved by cloud gateway 606 and used in a keychain. Each managed application may have one associated client certificate, identified by a label that is defined in cloud gateway 606.

Cloud gateway 606 may interact with an Enterprise special purpose web service to support the issuance of client certificates to allow relevant managed applications to authenticate to internal PKI protected resources.

The receiver 604 and the MDX Framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the MDX Framework to mediate https requests).

MDX client certificate support on iOS may rely on importing a PKCS 12 BLOB (Binary Large Object) into the iOS keychain in each managed application for each period of use. MDX client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to cloud gateway 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP Negotiate authentication challenges. The limited support feature relates to constrained delegation in AFEE, where AFEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of StoreFront and App Controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Any one or more of the aforementioned computing environments may be used to perform one or more aspects of the image analysis and handling techniques described herein.

Analysis of Images and Image Management

Figure 7:
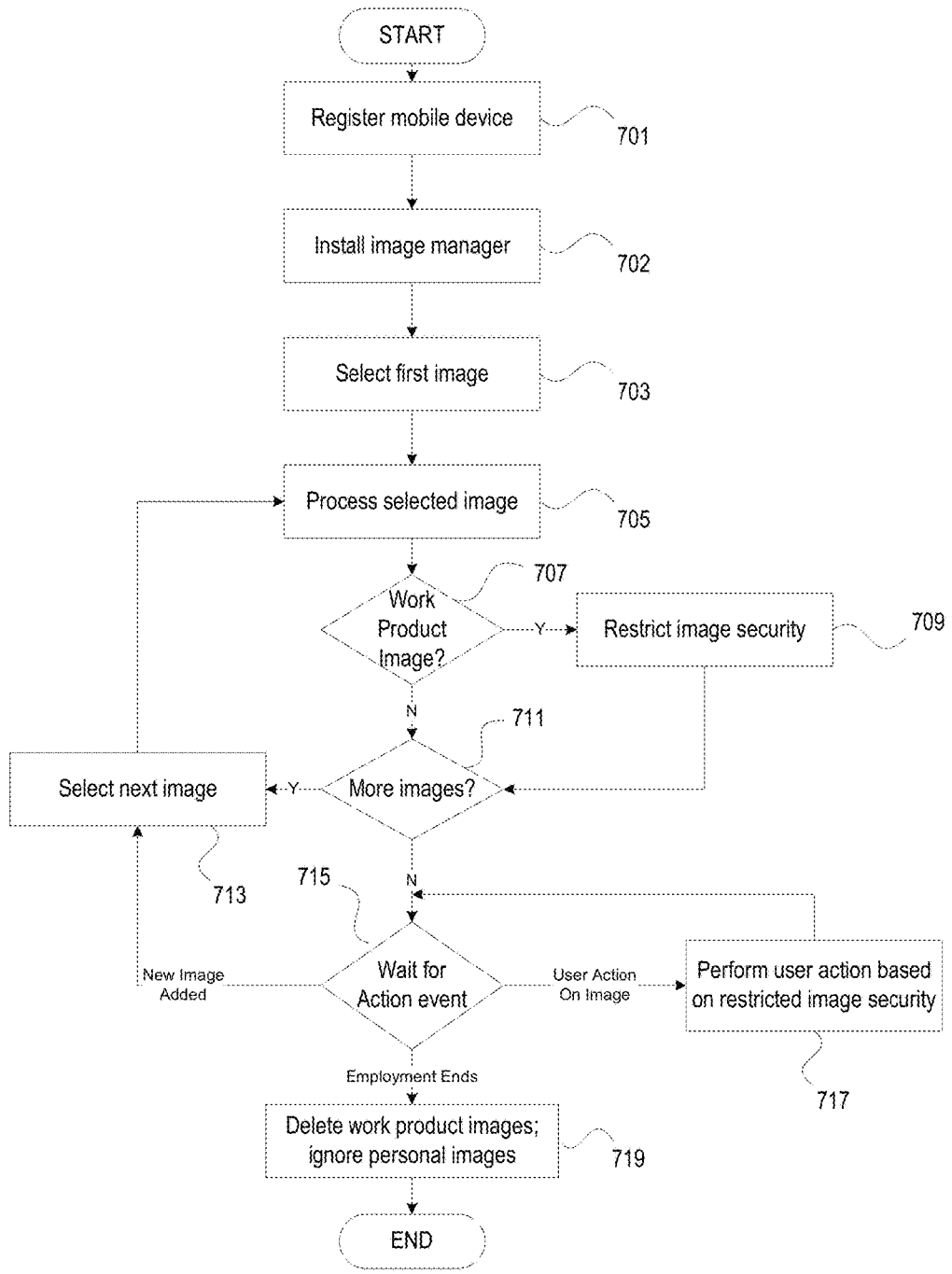
FIG. 7 depicts a method for analyzing and managing images in accordance with one or more illustrative aspects described herein.

As discussed above, a mobile device may be used for business use and/or personal use, and an enterprise may want to delete from the mobile device or otherwise control selected or all data, files, and/or applications owned, licensed or controlled by the enterprise. Such data or files may include images or pictures that may include sensitive or proprietary enterprise information. FIG. 7 depicts a method for analyzing and managing images, such as images that include sensitive or proprietary enterprise information.

At step 701, the mobile device may be registered. In some arrangements, the mobile device may register to become an enrolled device so that, for example, the mobile device can be managed through an application of mobile device management policies. Additionally, the mobile device may register with an enterprise resource or enterprise service that provides image analysis or management functions on behalf of the enterprise, or that manages the services a mobile device is registered to. For example, the mobile device may register with a device manager so that the enterprise has a record of the mobile device being enrolled in an image analysis or management service. In some arrangements, the mobile device may register by connecting to an enterprise resource or enterprise service (e.g., via a wireless link or VPN), authenticating (e.g., device authentication, user authentication), and receiving an acknowledgement of successful registration.

At step 702, the mobile device may install an image manager. The image manager may be included as part of an application, plug-in to another application installed on the mobile device, a receiver (e.g., receiver 604), or a policy obtained by a receiver (e.g., a policy for use with MDX framework 614). For example, the mobile device may connect to an application store (e.g., application store 578), an enterprise resource, or an enterprise service (e.g., policy manager 570) to request and/or receive the image manager (e.g., via a download). Upon receiving the image manager, it may be installed on the mobile device. The image manager may enforce a work product image security protocol provided by the enterprise. In some arrangements, the image manager may have access to the image management software or image storage location of the mobile device, such as the device's image gallery, image folder, or download folders. The image manager may be able to interface with the device's image gallery via an API that includes, for example, functions to scan, select, edit, or delete an image from the image gallery.

The image manager may be able to execute in both the foreground and the background. When in the foreground, a user interface may be displayed on the mobile device that provides various options to a user for analyzing and managing the images stored on the mobile device. In addition to providing the user interface, the image manager may also analyze and manage the images on the mobile device. When operating in the background, the image manager may continue to analyze and manage the images on the mobile device. The remaining steps of FIG. 7 generally describe an example process that may be performed, in some variations, by an image manager executing on the mobile device.

At step 703, the image manager may select a first image. The first image may be any image stored by the mobile device that has not yet been analyzed or managed. For example, the image manager may scan a gallery of the mobile device, identify an image, compare the image (e.g., the image's file name, time code, or other identifying information) with a record of images that have been analyzed and managed, and if the image has not been analyzed and managed (e.g., the image's file name, time code, or other identifying information was not found in the record) the image may be selected.

At step 705, the image manager may process the selected image. In some instances, the selected image may be the image selected at step 703. In others, the selected image may be an image selected at step 713. In some arrangements, processing may include updating the record to include an entry for the selected image, such as by storing an entry that includes the selected image's file name, time code, or other identifying information.

Processing the image may include analyzing the image to identify various elements of the image. For example, the image manager may employ various image analysis and classification techniques to identify the presence within the image of elements that may be considered sensitive or proprietary enterprise information. To perform such image analysis, image analysis and classification techniques such as background segmentation, object segmentation, edge detection, template matching, optical character recognition, and the like, may be used. In particular, some embodiments may employ techniques suitable to identifying whiteboards, charts (e.g., a flipchart), and documents (e.g., paper documents and digital documents, such as an image of a document displayed on a computer display), which can include large areas of white space (or other large single color space), printed fonts (e.g., a document with letters in the Helvetica or Times New Roman font) and hand drawn writing (e.g., letters or words written in a small number of colors, such as black, red or green), and/or graphical elements (e.g., boxes, charts). Techniques that separate the areas of white space from other portions of the image (e.g., a "dirty" background) may be used when analyzing the image.

Figure 8:
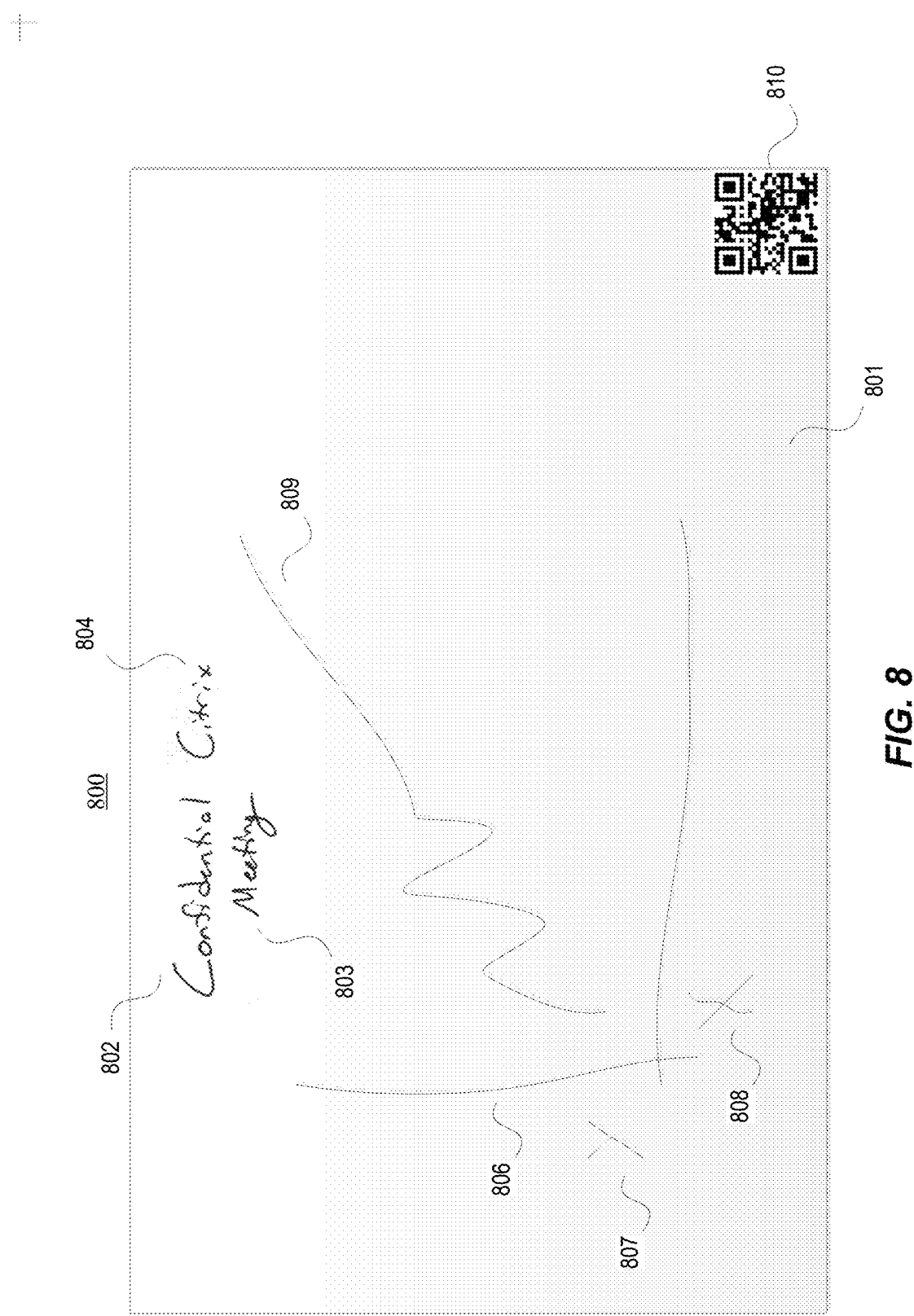
FIG. 8 depicts various elements that may be present in an image according to various aspects described herein.

FIG. 8 depicts various elements that may be present in an image. Image portion 800 includes various elements that may likely have sensitive or proprietary enterprise information. The elements of example image portion 800 can be identified by image analysis techniques, such as the techniques used by the image manager at step 705. Indeed, a segmentation algorithm may be used to separate whitespace area from one or more non-whitespace areas of a selected image (not shown), resulting in, for example, image portion 800, which includes whitespace area (e.g., whitespace element 801) and, in some instances, one or more other elements (e.g., elements 802, 804, 806, 808 and 810). Additional analysis techniques may be used to identify the elements included in an image.

For example, optical character recognition may be used to identify writing elements, such as writing elements 802 ("Confidential"), 803 ("Meeting"), 804 ("Citrix"), 807 ("X") and 808 ("Y").

Template matching may be used to identify axes element 806.

Object recognition may be used to identify a handwritten graph element, such as line graph element 809.

In some arrangements, template matching may also be used to identify the presence of a chart element, which may be composed of multiple elements. For example, template matching may identify a chart element based on elements 806, 807, 808, and 809, such as by having a template that includes the axes (e.g., perpendicular lines arranged as a two-dimensional Cartesian coordinate system), the axes labels (e.g., 'x' and 'y' arranged near the origin of the axes), and a line representing a plotted line graph. Additionally, object recognition may be used with template matching to identify the chart element (e.g., object recognition to identify the line graph element and template matching to identify the axes element).

Different templates and/or object recognition processes may be used to identify different chart or graph elements, such as bar graphs, pie graphs, process charts, tree hierarchies, and the like. For example, template matching or object recognition could be used to identify a process chart element (e.g., an element including the entirety or a portion of FIG. 6), which may include one or more boxes (having writing inside each box) and relational arrows between the boxes.

The image may also be analyzed for particular machine readable codes, such as a quick recognition (QR) code or bar code. The image manager may process the image to identify the presence of code element 810 and, in some arrangements, may process the machine readable code element to determine information encoded by the element (e.g., machine readable code element 810 encodes information identifying a web site of Citrix).

Identifying various elements within an image may include executing a few different image analysis techniques. For example, the image manager may process image portion 800 using a color segmentation technique or edge segmentation technique prior to performing template matching or object recognition to identify an element. As other examples, image portion 800 may be processed using border detection algorithms or color gradient detection algorithms to identify hand drawn lines (e.g., element 809), an arrow element (e.g., an element including the arrow connecting steps 703 and 705 of FIG. 7), a geometric shape element (e.g., a box shape such as the rectangle depiction of step 703 of FIG. 7 or the diamond shape such as the diamond depiction of step 707 of FIG. 7)

While the example of FIG. 8 depicts a few elements that are likely to include sensitive or proprietary enterprise information, other elements could be identified by the image manager including elements that are not likely to include sensitive or proprietary enterprise information. In some arrangements, elements that are not likely to include sensitive or proprietary enterprise information may include exterior elements (e.g., a skyline, a tree, grass, or a mountain), person elements (e.g., a person or body part, such as a hand or head) and the like.

What elements can be identified by the image manager may be defined by the enterprise or the user. For example, the enterprise may label each whiteboard or flip chart in its premises with a particular QR code and the image manager may be configured to identify the particular QR code. As another example, the user may be presented with a user interface that lists the various elements that can be identified by the image manager and the user may be able to select or deselect elements that the image manager is configured to identify.

Additionally, while the above examples relate to employ techniques suitable to identifying whiteboards, charts, and documents, other techniques could be employed that are suitable to identifying elements specific to the business of the enterprise. As one particular example, the enterprise may be a microchip manufacturer or design company. Various techniques, such as template matching and object recognition, could be used to identify integrated circuit components (e.g., using template matching or object recognition to identify a large area of black space and silver pins placed around the perimeter of the black space; object recognition to identify a printed circuit board), a design of an integrated circuit (e.g., template matching or object recognition to identify a depiction of a logic gate, such as an AND gate, OR gate, or the like), or chip part numbers that are commonly printed onto an integrated circuit (e.g., optical character recognition for chip part numbers that are produced by the enterprise).

Processing the image may, in some embodiments, also include pre-processing at step 705, such as to eliminate a selected image from further processing. For example, if the image includes a large number colors or non-linear color areas (e.g., an area within the image having a large number of colors that change from pixel to pixel in a non-linear fashion), the image manager may prevent the selected image from being processed further at step 705 to identify elements (thereafter causing a determination that the selected image is a non-work product image, as discussed further below in connection with step 707).

After processing the image at step 705, the image manager may proceed to step 707 to determine whether the selected image is a work product image. In some arrangements, this determination is based on the elements that were identified at step 705. For example, if an element considered to likely include sensitive or proprietary enterprise information is identified in the selected image, the image manager may determine that the image is a word product image (e.g., determine that the selected image is a work product image if any of elements 801, 802, 803, 804, 806, 807, 808, 809 and 810 are identified, or determine that the selected image is a work product image if a process chart element is identified, for example, from an image taken of FIG. 6).

As another example, the image manager may base the determination of whether the selected image is a work product image on particular elements not being identified in the selected image. For example, when a white space element (e.g., element 801) is not identified in an image, the image manager may determine that the image is not a work product image.

The image manager may also determine whether the selected image is a work product image based on both the presence and the absence of particular elements in the selected image. For example, image manager may determine that an image is a work product image when a white space element (e.g., element 801) is identified in the image and at least one other element likely to include sensitive or proprietary enterprise information is also identified in the image (e.g., one or more of elements 802, 803, 804, 806, 807, 808, 809 or 810).

The image manager may also determine whether the selected image is a work product image based on content of the identified elements. For example, the image manager may determine that an image is a work product image when a machine readable element encodes particular information. With respect to the example of FIG. 8, image manager may determine that the image is a work product image when element 810 encodes information specifying a website of the enterprise. As another example, the image manager may determine that an image is a work product image when a writing element includes particular recognized text. With respect to the example of FIG. 8, image manager may determine that the image is a work product image when one of the depicted writing elements includes text matching a name of the enterprise (e.g., element 804 and the recognized text of "Citrix") or other specific text (e.g., element 802 and the recognized text of "Confidential" or element 803 and the recognized text of "Meeting").

The image manager may also determine whether the selected image is a work product image based on the presence/absence of elements and further based on the content of the identified elements. For example, the image manager may determine that an image is a work product image if a white space element is identified (e.g., element 801) and another identified element includes particular text (e.g., element 802 and the recognized text of "Confidential"; element 803 and the recognized text of "Meeting"; or element 804 and the recognized text matching a name of the enterprise) or encodes particular information (e.g., element 810 and the encoded information of the enterprise's website).

The image manager may also determine whether the selected image is a work product image based on a set of elements being present and/or absent from the image or a threshold number of elements being present and/or absent from the image. For example, the image manager may determine that an image is a work product image if a white space element is identified (e.g., element 801) and at least one other element (e.g., element 802, 803, 804, 806, 807, 808, 809 or 810) is also identified. Such an example could be referred to as requiring a threshold of two elements being present in the selected image. As another example, in embodiments where, for example, the enterprise is a microchip manufacturer or design company, the image manager may determine that an image is a work product image if at least three part numbers are identified in the image.

The image manager may also determine whether the selected image is a work product image based on how the elements are arranged. For example, if elements are arranged in a tree fashion and each element is a writing element or a graphic element, the image manager may determine that such an image is a work product image (e.g., such arrangements and elements may be found in an image of the enterprise's organizational chart).

Additionally, some embodiments may include input from a user when determining whether an image is a work product image. For example, the image manager may request or receive input from a user that identifies particular elements in the image or that specifies whether the image is a work product image or not. Indeed, in some arrangements, the image manager may determine that a threshold number of elements that are unlikely to include sensitive or proprietary enterprise information are present in the image and, responsively, may request input from the user to specify whether the image is a work product image or not. Alternatively, the image manager may determine that a ratio between elements likely to include sensitive or proprietary enterprise information present in an image and elements unlikely to include sensitive or proprietary enterprise information present in the image is equal to or above a threshold and, responsively, may request input from the user to specify whether the image is a work product image or not.

In various arrangements, a user or the enterprise may specify how the image manager performs the determination of whether an image is a work product image. For example, the user or the enterprise may be able to specify which elements are required to be present/absent for the image to be determined as a work product image (e.g., specify that an image which includes a white space element and a graph element is to be determined as a work product image). The user or the enterprise may also be able to specify what information should be included/encoded by an element for the image to be determined as a work product image (e.g., specify that an image which includes a machine readable code element encoding particular information, such as an enterprise's website, is to be determined as a work product image).

If the image manager determines that the selected image is a work product image, the method may proceed to step 709. Otherwise, the method may proceed to step 711. However, in some arrangements, instead of proceeding directly to step 711 when the selected image is not a work product image, the image manager may optionally perform additional processing on the image (not shown). For example, the image manager may make a copy of the selected image and store the copy in a non-work product image backup location. In some arrangements, the non-work product backup location may be at the mobile device (e.g., in a private data vault of the image manager, or other secure location) or at a remote location (e.g., a secure location accessed via a cloud gateway). In some embodiments, the user or enterprise may be able to set the non-work product backup location. Additionally, the image manager may update its record of images that have been analyzed and managed to indicate that the selected image does not have restricted security and/or is a non-work product image. Further, the user may be required to opt-in to the non-work product backup service provided by the image manager.

At step 709, the selected image is considered a work product image (due to the determination at step 707) and the image manager may restrict image security to prevent unauthorized viewing of the image. The ability of the image manager to restrict image security may depend on the API of the mobile device. As discussed above, a mobile phone's gallery software may include an API for editing an image (e.g., an Edit function). In some embodiments, it may be possible to restrict image security using the Edit function. For example, the image manager may create a copy of the selected image and store the copy in a work product image backup location. In some arrangements, the work product backup location may be at the mobile device (e.g., in a private data vault of the image manager, or other secure location) or at a remote location (e.g., a secure location accessed via a cloud gateway). The backup location may be specified by a setting of the image manager which, in various embodiments can be set or specified by the enterprise or user. Additionally, the image manager may update the record of images that have been analyzed and managed with a pathname to the copy of the selected image. In some embodiments, the copy may be encrypted with a key known by the image manager.

Figure 9:
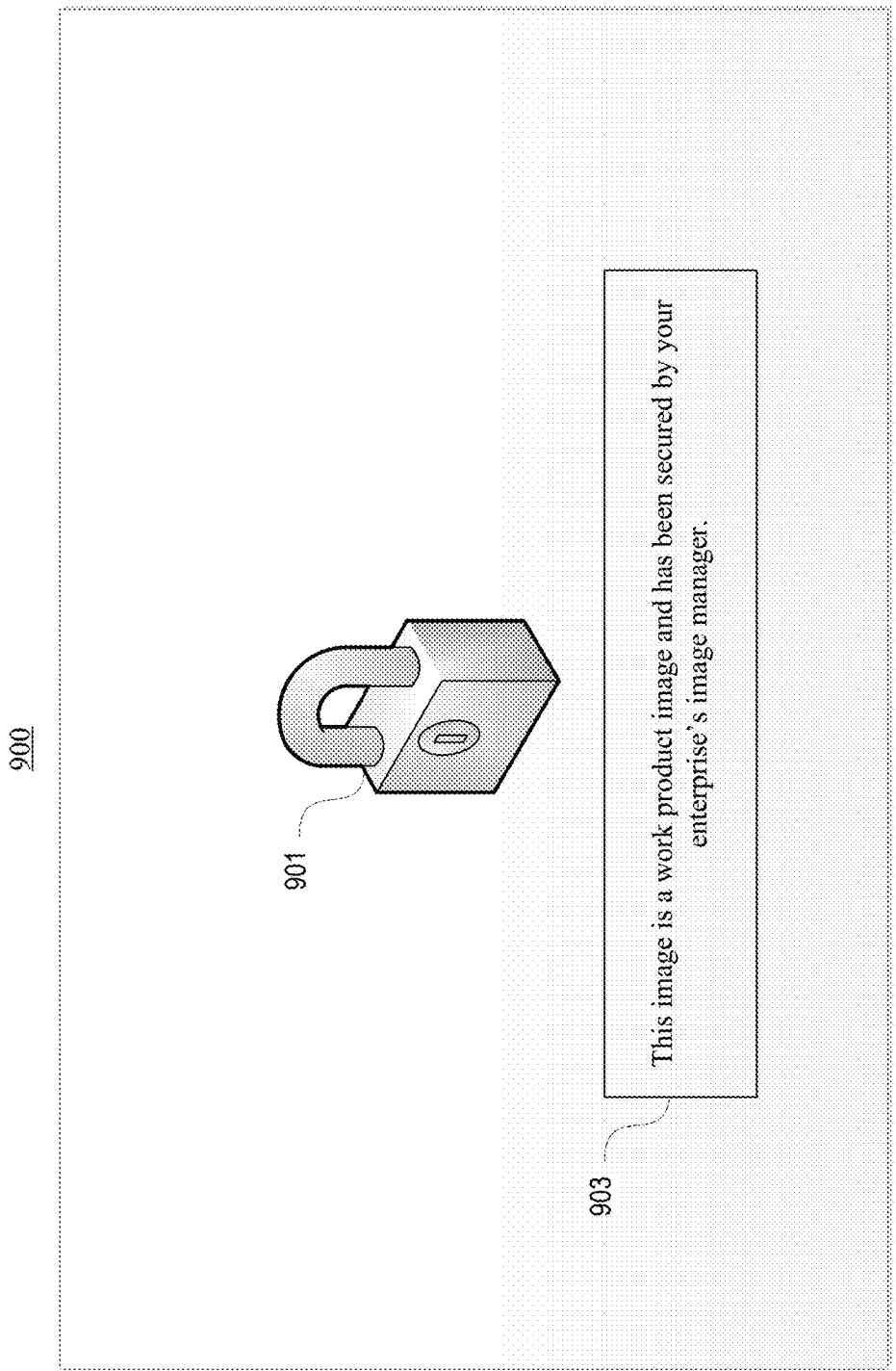
FIG. 9 depicts an example image with restricted image security according to one or more illustrative aspects described herein.

Using the Edit function, the selected image may be edited to restrict its security. For example, the image manager may edit the image to prevent unauthorized viewing of the image. For example, the image data may be replaced with a default image, such as an image including a lock icon or text identifying the image as being secured by the enterprise (e.g., "This image is a work product image and has been secured by your enterprise's image manager"). Example image 900 of FIG. 9 provides an example of an image with restricted image security. As illustrated in FIG. 9, the original image data of image 900 has been edited to have a lock icon 901 and text 903. For illustrative purposes, the original image data of image 900 could be considered to be the image data depicted in FIG. 8. Such editing of the original image data of image 900 prevents viewing of the original image data until it has been restored by the image manager.

The image manager may restrict image security in other additional or alternative ways. For example, image manager may, instead of backing up a copy of the image, may encrypt the image with a key known by the image manager. As another example, the image manager may delete the selected image from the mobile device. In some embodiments where the image manager deletes the selected image from the mobile device, the image manager may, prior to the deletion of the selected image, store a backup of the selected image.

Additionally, the image manager may update its record of images that have been analyzed and managed to indicate that the selected image has restricted security and/or is a work product image.

The image manager may also, in some variations, transmit user notifications including, for example, an indication that the selected image was a work product image and/or an indication of what security measures were employed. Such user notifications may include a pop-up message displayed on the mobile device that, for example, requests the user accept (or cancel) the restricted image security being applied to the selected image, or a push notification displayed in a notification bar of the mobile device's user interface that provides notice to a user of the selected image's restricted security.

After the image manager has restricted image security, the method may proceed to step 711.

In some variations, one or more of steps 705, 707 or 709 may be performed by one or more remote computing devices (e.g., by an enterprise resource 504 or an enterprise resource 508). For example, if step 705 is performed by one or more remote computing devices, the selected image may be transmitted from the mobile device to the one or more remote computing devices (e.g., via a VPN connection), so that the one or more remote computing devices can perform the processing of the selected image.

If step 707 is performed by one or more remote computing devices, the one or more remote computing devices may receive elements identified during the selected image's processing (e.g., via a communication from the mobile device if the processing is performed by the mobile device, or resulting from the processing of the selected image if the processing of step 705 is performed by the one or more remote computing devices) and determine whether the selected image is a work product image based on the elements (in a manner similar to how the image manager may perform the determination of step 707). In some arrangements where the one or more remote computing devices perform step 707, a message indicating whether the selected image is a work product image may be transmitted from the one or more remote computing devices to the mobile device (e.g., via a VPN connection) so that the image manager may proceed with the remaining steps of FIG. 7.

If step 709 is performed by one or more remote computing devices, the one or more remote computing devices may receive an indication that the selected image is a work product image (e.g., via a communication from the mobile device if the determination of step 707 is performed by the mobile device, or resulting from the determination at step 707 if step 707 is performed by the one or more remote computing devices) and the selected image (e.g., via a communication from the mobile device if step 705 is performed by the mobile device, or resulting from the determination at step 705 if step 705 is performed by the one or more remote computing devices). Upon receiving the indication that the selected image is a work product image and the selected image, the one or more remote computing devices may proceed to restrict image security, such as by backing up a copy of the selected image's original image data and editing the original image data to prevent unauthorized viewing (similar to the manner in which the image manager can restrict security at step 709). In some arrangements where the one or more remote computing devices perform step 709, may be transmitted from the one or more remote computing devices to the mobile device so that the image manager may proceed with the remaining steps of FIG. 7. Such data may include an indication of whether the selected image is a work product image or not, an indication of what security restrictions where placed on the image (e.g., encryption, the key used, etc.), and where a copy of the selected image's original image data was stored (e.g., the work product image backup location). Upon receiving such data, the image manager may update its record of analyzed and managed images.

At step 711, the selected image is either a work product image with restricted image security (via step 709) or the selected image is not a work product image. At step 711, the image manager may determine whether there are additional images on the mobile device that have not been analyzed or managed. This determination may include comparing images in the mobile device's gallery with the image manager's record of images that have been analyzed and managed. If there are images in the gallery that are not in the record of images that have been analyzed and managed, the image manager may determine that more images need to be analyzed or managed and may proceed to step 713. Otherwise, the image manager may determine that all images on the mobile device have been analyzed or managed and may proceed to step 715.

At step 713, the image manager may select the next image to analyze or manage. This step may proceed similar to step 703 and may result in one of the images in the mobile device's gallery being selected for analysis and/or managing. After selecting the next image, the method may proceed to step 705.

At step 715, the image manager may wait for an action event. The image manager may be configured to recognize various action events as they occur. The example method of FIG. 7 illustrates three possible action events that can be recognized by an image manager: (1) actions that occur when a user interacts with an image ("user actions"), such as a user viewing an image on the mobile device; (2) actions that are initiated by the enterprise ("enterprise actions"), such as a selective delete message being received by the image manager from the enterprise when a user's employment ends; and (3) actions that occur when an image is created ("image creation actions"), such as a new image being added to the mobile device's gallery.

When an action event occurs, the image manager may determine which action event has occurred and may respond in a manner specific to which action event has occurred. For example, if user action occurs, the image manager may proceed to step 717 to perform the user action based on an image's restricted image security. If an enterprise action occurs, the image manager may proceed to step 719 to delete work product images. If an image creation action occurs, the image manager may proceed to step 713 to select the new image and subsequently analyze and manage the new image.

At step 717, the image manager may perform the user action based on the restricted image security. Generally, a user action is associated with a particular image (e.g., a user may request to view or open a particular image). Prior to performing the user action, the image manager may determine whether the associated image has restricted image security or is a work product image (e.g., by checking the image manager's record of images that have been analyzed and managed).

After determining whether the associated has restricted image security or is a work product image, the image manager may proceed with performing the user action based on the restricted image security. For example, if the associated image has restricted image security or is a work product image and the user action is to view the associated image, the image manager may restore the original image data of the associated image (e.g., replace the image data illustrated in FIG. 9 with the original image data illustrated in FIG. 8) to remove the restricted image security. In some instances, the image manager may decrypt the associated image to remove the restricted image security. Upon removing the restricted image security, the image manager may cause display of the original image data. In some arrangements, the original image data may be retrieved from a work product image backup location.

As another example, if the associated image has restricted image security or is a work product image and the user action is to edit the associated image, the image manager may determine whether editing a work product image is authorized. If editing is authorized, the image manager may allow the user to edit the associated image.

As yet another example, if the associated image has restricted image security or is a work product image and the user action is to delete the associated image, the image manager may determine whether the user also wishes to remove a backup copy of the associated image (e.g., the copy stored at the work product image backup location). If the user requests to remove the backup copy, the image manager may cause the copy to be deleted and may update its record of images that have been analyzed and managed to reflect the deletion. Subsequently, the image manager may cause the associated image to be deleted from the mobile device.

As yet another example, if the associated image has restricted image security or is a work product image and the user action is to close the associated image, the image manager may reapply restricted image security (e.g., perform functions similar to those discussed above in connection with step 709). For example, the image manager may reencrypt the associated image or reedit the associated image to prevent unauthorized viewing.

In some embodiments, the image manager may perform the user action based on additional security conditions. For example, in some embodiments, the image manager may allow the user to view, edit, or delete a work product image only if a VPN connection to the enterprise exists or if the user enters a password. If the VPN connection does not exist or the user fails to enter a correct password, the image manager may not perform the user action. Similarly, in some variations, the image manager may remove image security only if a VPN connection to the enterprise exists or if the user enters a password. For example, if the user wishes to view a work product image, but a VPN connection does not exist or the user fails to enter a correct password, the image manager may cause the secured image data to be displayed (e.g., display the image data illustrated in FIG. 9, or display the encrypted image data).

If the associated image does not have restricted image security or is not a work product image, the image manager may proceed with performing the user action without additional processing.

At step 719, an enterprise action has occurred and the image manager may proceed to delete work product images. In some variations, an enterprise action may occur when a user's employment ends (e.g., a message sent by the enterprise indicating that a user of the mobile device is no longer employed by the enterprise), when a mobile device is lost or stolen (e.g., a message sent by the enterprise indicating that the mobile device has been reported lost or stolen), when an enterprise sends a command to the mobile device to delete work product images (e.g., an enterprise may cause deletion of work product images according to a periodic schedule or in accordance with a quota that specifies the maximum amount of work product images that may be stored at the mobile device), or according to a different security procedure implemented by the enterprise. Responsive to the enterprise action occurring, the image manager may proceed through the mobile device's gallery and may delete any image in the gallery that is a work product image. Any non-work product image may be ignored (e.g., not deleted). In some variations, only work product images that are included on the image manager's record of images that have been analyzed and managed may be deleted at step 719. Additionally, when deleting work product images, the image manager may update its record to reflect the deletion. Some enterprise actions may cause the image manager to respond differently than deleting work product images. For example, an enterprise action may cause the image manager to reprocess all images stored on the mobile device. Such enterprise actions may occur when the enterprise changes what criteria needs to be satisfied for an image to be determined as a work product image, when the enterprise changes what elements are to be identified in an image, or when the enterprise changes how a work product image's security is restricted. On particular example of an enterprise action that causes the image manager to reprocess all images stored on the mobile device is when the enterprise transmits an update to the image manager to the mobile device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
    performing, by a computing device, image analysis on an image stored by the computing device to determine one or more text elements present in the image and one or more graphical elements present in the image;
    determining that the image is a work product image based on determining that at least one of the one or more text elements or the one or more graphical elements includes proprietary information; and
    responsive to determining that the image is a work product image, restricting image security to prevent unauthorized viewing of the image.

2. The method of claim 1, wherein restricting image security to prevent unauthorized viewing of the image comprises editing original image data of the image to prevent unauthorized viewing of the original image data.

3. The method of claim 2, further comprising:
    determining that a user has requested to view the image;
    responsive to determining that the user has requested to view the image, restoring the original image data; and
    causing display of the image subsequent to restoring the original image data.

4. The method of claim 3, further comprising:
    determining that the user has requested to close the image; and
    responsive to determining that the user has requested to close the image, reapplying restricted image security to prevent unauthorized viewing of the image.

5. The method of claim 1, further comprising:
    determining that an enterprise event has occurred; and
    responsive to determining that the enterprise event has occurred, delete only work product images stored at the computing device and ignoring non-work product images.

6. The method of claim 1, wherein performing image analysis on the image to determine the one or more text elements present in the image and the one or more graphical elements present in the image includes performing image analysis on the image to determine one or more whitespace elements present in the image.

7. The method of claim 1, wherein the proprietary information includes a chart.

8. The method of claim 1, wherein the proprietary information includes handwriting.

9. The method of claim 1, wherein the computing device is a mobile device used by an employee of an enterprise, and all steps are performed by an image manager installed on the mobile device that enforces a work product image security protocol required by the enterprise.

10. A method, comprising:
    performing, by a computing device, image analysis on an image stored by the computing device to determine one or more text elements present in the image and one or more graphical elements present in the image;
    determining that the image is a work product image based on an analysis of the one or more text elements and the one or more graphical elements that determines presence of proprietary information in at least one of the one or more text elements or the one or more graphical elements; and
    responsive to determining that the image is a work product image, restricting image security to prevent unauthorized viewing of the image.

11. The method of claim 10, wherein restricting image security to prevent unauthorized viewing of the image comprises editing original image data of the image to prevent unauthorized viewing of the original image data.

12. The method of claim 11, further comprising:
    determining that a user has requested to view the image;
    responsive to determining that the user has requested to view the image, restoring the original image data; and
    causing display of the image subsequent to restoring the original image data.

13. The method of claim 12, further comprising:
    determining that the user has requested to close the image; and
    responsive to determining that the user has requested to close the image, reapplying restricted image security to prevent unauthorized viewing of the image.

14. The method of claim 10, further comprising:
    determining that an enterprise event has occurred; and
    responsive to determining that the enterprise event has occurred, delete only work product images stored at the computing device and ignoring non-work product images.

15. The method of claim 10, wherein performing image analysis on the image to determine the one or more text elements present in the image and the one or more graphical elements present in the image includes performing image analysis on the image to determine one or more whitespace elements present in the image.

16. The method of claim 10, wherein the proprietary information includes a chart.

17. The method of claim 10, wherein the proprietary information includes handwriting.

18. The method of claim 10, wherein the computing device is a mobile device used by an employee of an enterprise, and all steps are performed by an image manager installed on the mobile device that enforces a work product image security protocol provided by the enterprise.

19. An apparatus, comprising:
one or more processors; and
memory storing executable instructions configured to, when executed by the one or more processors, cause the apparatus to:
perform image analysis on an image stored by the apparatus to determine one or more text elements present in the image and one or more graphical elements present in the image;
determine that the image is a work product image based on an analysis of the one or more text elements and the one or more graphical elements that determines presence of proprietary information in at least one of the one or more text elements or the one or more graphical elements; and
responsive to determining that the image is a work product image, restrict image security to prevent unauthorized viewing of the image.

20. The apparatus of claim 19, wherein causing the apparatus to restrict image security to prevent unauthorized viewing of the image comprises causing the apparatus to edit original image data of the image to prevent unauthorized viewing of the original image data.

\* \* \* \* \*